United States Patent [19]

Teegarden et al.

[11] Patent Number: 5,250,624
[45] Date of Patent: Oct. 5, 1993

[54] MISCIBLE BLENDS OF POLYAMIDES AND VINYLPHENOL CONTAINING POLYMERS

[75] Inventors: David M. Teegarden, Rochester; Christine J. T. Landry; Michael R. Landry, both of Honeoye Falls; Timothy E. Long, Hilton; Dennis J. Massa, Pittsford; Ralph H. Colby, Rochester, all of N.Y.

[73] Assignee: Eastman Kodak Company, Rochester, N.Y.

[21] Appl. No.: 879,679

[22] Filed: May 7, 1992

[51] Int. Cl.$^5$ .................... C08L 77/00; C08L 77/02
[52] U.S. Cl. ............................ 525/178; 525/179; 525/241
[58] Field of Search ............... 525/178, 179, 184

[56] References Cited

U.S. PATENT DOCUMENTS

| | | | |
|---|---|---|---|
| 3,449,273 | 6/1969 | Kettenring et al. | 260/18 |
| 4,148,775 | 4/1979 | Shima et al. | 260/30 |
| 4,221,700 | 9/1980 | Minagawa | 524/128 |
| 4,849,474 | 7/1989 | Gallucci | 525/92 |
| 4,880,487 | 11/1989 | Sheehan et al. | 156/327 |

OTHER PUBLICATIONS

Ahn, T. O. et al., "Binary Blend of Nylons With Ethylene Vinyl Alcohol Copolymer: Morphological, Thermal, Rheological, and Mechanical Behavior." *Polymer Engineering and Science*, vol. 30, No. 6, Mar., 1990, pp. 341-349.

Ellis, Thomas, "Miscibility and Immiscibility of Polyamide Blends." *Macromolecules*, vol. 22, (1989), pp. 742-754.

Serman, C. J. et al., "Studies of the phase behavior of poly(vinylphenol)-poly(n-alkyl methacrylate) Blends." *Polymer*, vol. 32, No. 6, (1991).

Frechet, J. M. J. et al., "Novel derivatives of poly(4-hydroxystyrene) with easily removable tertiary, allylic, or benzylic ethers." *Polymer Bulletin*, vol. 20, (1988), pp. 427-434.

Chemical Abstract 105:(4)32956u (1986) (Jpn Kokai Tokkyo Koho JP 61 26,057, Feb. 5, 1986, Ishikawa, Fumihiko et al.).

M. M. Coleman, et al., "Thermodynamics of Hydrogen Bonding Polymer Blends. 3. Experimental Studies of Blends Involving Poly(4-vinylphenol)." (1989) *Macromolecules*, vol. 22, pp. 586-595.

Tang, W-L et al., "Hydrogen Bonding in Liquid Crystal/Random Coil Polymer Blends." (Apr., 1990) *Polymer Preprintes*, vol. 31, No. 1, pp. 541-542.

Moskala, E. J. et al., "Concerning the Miscibility of Poly(vinyl phenol) Blends-*FTi.r.* Study." (1989), *Polymer*, vol. 26, pp. 228-233.

Primary Examiner—James J. Seidleck
Assistant Examiner—I. Zemel
Attorney, Agent, or Firm—Judith A. Roesler

[57] ABSTRACT

A miscible blend composition comprising (a) a polyamide having a melting point greater than about 175° C. or is amorphous and (b) a vinylphenol containing polymer. The blend is particularly useful for packaging applications due to its chemical resistance and clarity.

19 Claims, No Drawings

MISCIBLE BLENDS OF POLYAMIDES AND VINYLPHENOL CONTAINING POLYMERS

FIELD OF THE INVENTION

The present invention relates to miscible blends of polymers. The miscible blends exhibit a single glass transition temperature and are useful for both molded and film applications.

BACKGROUND OF THE INVENTION

Polyamides, commonly referred to as nylons, are known polymers having amide groups in the polymer backbone. Polyamides have achieved great commercial success as used in synthetic fibers and engineering resins, and if not too crystalline, as plastics.

Although polyamides have many desirable characteristics, modification of the properties of the polymer would be useful. For example, for certain applications, it would be advantageous if the polyamides would have reduced crystallization kinetics so as to produce amorphous materials or materials with low crystallinity. Additionally, in some applications, it would be advantageous to raise the glass transition temperature ("$T_g$") of polyamides (as defined hereinafter). Also, it would be advantageous to increase the hydrophobicity of polyamides.

One known method of altering the characteristics of the polyamides is by synthesizing discrete polyamide copolymers, also, substituents are often added to the nylon chain to reduce crystallinity. Both techniques, however, are very difficult and often expensive.

Blending polyamides with other classes of polymers is an option to copolymerization, however, it is not predictable whether the blend will be miscible or immiscible. A major feature encountered when two polymers are mixed is that in the majority of combinations, the blend is immiscible and components tend to phase-separate to form heterogeneous mixtures. Immiscible blends are not desirable because they have low physical attractive forces across phase boundaries and suffer from delamination at the phase boundaries. Consequently, immiscible blends have inferior properties when compared to the pure components and therefore are limited in their usefulness. Polymer blends that are miscible, on the other hand, are desirable because they are not phase separated. Miscible blends are one-phase compositions where the stratification of the polymeric components during or after processing is generally avoided, thus allowing the blend composition to be useful for many applications. A number of methods may be used to determine the miscibility of polymer blends, such as, for example, optical transparency (in the absence of crystallinity), a single glass transition temperature ($T_g$), nuclear magnetic resonance, transmission electron microscopy, and excimer fluorescence (as discussed in Concise Encyclopedia of Science and Engineering, Ed. J. I. Kroschwitz, published by John Wiley & Sons, Inc., 1990, pp.629–632). As discussed herein, by miscible blends, it is meant that blends of two or more polymers behave as a single homogeneous material, exhibiting a single $T_g$.

There is a continuing need to discover methods to increase the versatility of polyamides.

SUMMARY OF THE INVENTION

In accordance with the present invention there is provided a novel miscible blend composition comprising (a) a polyamide wherein the polyamide has a melting point greater than about 175° C. or is amorphous and (b) a vinylphenol containing polymer.

It is an advantageous feature of this invention that the above-described blend is miscible and does not exhibit large scale phase separation. The miscibility of the novel blend is demonstrated by the presence of a single, composition dependent $T_g$ rather than a $T_g$ value for each polymeric component. It has been found that blending a polyamide with a vinylphenol containing polymer either reduces or eliminates the crystallinity of the polyamide or decreases the rate of crystallization of the polyamide. Consequently, the resulting miscible blend has a greater clarity than the original polyamide.

The novel blend is useful for both molded and film applications. The blend is particularly useful for engineering applications. Additionally the blend is useful in packaging applications due to its chemical resistance and clarity. Other uses will be apparent to those skilled in the art.

DETAILED DESCRIPTION

As known to those skilled in the art, the values of $T_g$ reported for the same polymer may differ. The $T_g$ for the same polymer may vary sometimes as much as 10°–20° C. because the glass transition occurs over a temperature range rather than at a single, sharply defined temperature, and therefore the observed $T_g$ varies somewhat, depending on the method of measurement used and on the thermal history of the sample. The $T_g$ can be measured by a number of techniques known to those skilled in the art, including, for example, dilatometry (qv), differential scanning calorimetry, dynamic mechanical measurement, and dielectric measurement. Miscible blends exhibit a single value $T_g$ whereas immiscible blends do not (in other words, an immiscible binary blend will exhibit two $T_g$ values). A general discussion of $T_g$ is found in the Concise Encyclopedia of Science and Engineering, Ed. J. I. Kroschwitz, published by John Wiley & Sons, Inc., 1990, pp. 433–434.

Suitable polyamides employed in the novel miscible blend are either amorphous (and do not have a melting point) or crystalline, exhibiting a melting point of greater than about 175° C. Polyamides having a melting point temperature ($T_m$) greater than about 175° C. generally exhibit a good heat distortion temperature as well as good dimensional stability at higher use temperatures, as compared with polyamides having lower melting points. Mixtures of polyamides falling within the above-identified definition of polyamides may also be employed in the invention, with the ratio of polyamides in the polyamide mixture formulated as desired.

Polyamides outside the current invention include fully aromatic polyamides and polyamides having a melting point temperature of less than about 175° C. Fully aromatic polyamide polymers are not encompassed because generally they do not melt below 400° C. and would thus make the blending process very difficult. Polyamides with a melting point temperature of less than 175° C. are not encompassed because they tend to be easily distorted by high temperatures and are therefore not useful in engineering applications, which are one of the objective uses of the present blends.

As above-identified, polyamides suitable for this invention are well known and widely available and may be formed by condensation polymerization as well as addition polymerization, as discussed in Encyclopedia of Polymer Science and Engineering, 2nd Edition, 1985, Wiley, Vol. 11, pages 318-360. Preferred polyamides are as follows:

| PREFERRED POLYAMIDES | | |
|---|---|---|
| POLYAMIDE | STRUCTURE- | Tg, $T_m$ (°C.) |
| nylon 4 | $[-(CH_2)_3NHCO-]_n$ | 59  267 |
| nylon 4, 6 | $[-(CH_2)_4NHCO(CH_2)_4CONH-]_n$ | 58  291 |
| nylon 6 | $[-(CH_2)_5NHCO-]_n$ | 40  223 |
| nylon 6, 6 | $[-(CH_2)_4NHCO(CH_2)_6CONH-]_n$ | 45  262 |
| nylon 6, 9 | $[-(CH_2)_6NHCO(CH_2)_7CONH-]_n$ | 28  210 |
| nylon 6, 10 | $[-(CH_2)_6NHCO(CH_2)_8CONH-]_n$ | 25  222 |
| nylon 6, 12 | $[-(CH_2)_6NHCO(CH_2)_{10}CONH-]_n$ | 40  219 |
| nylon 11 | $[-(CH_2)_{10}CONH-]_n$ | 29  189 |
| nylon 12 | $[-(CH_2)_{11}CONH-]_n$ | 35  180 |
| nylon 3Me6T | $[-NHCO(C_6H_4)CONHCH_2C(CH_3)_2-$ $CH_2CH(CH_3)CH_2CH_2-]_n$ | 149  — |
| nylon MXD-6 | $[-NHCH_2(C_6H_4)CH_2NHCO(CH_2)_4CO-]_n$ | 84  231 |

More preferably, the polyamide employed is nylon 6, nylon 6,6, nylon 11, nylon 3Me6T, nylon MXD-6. Two particularly preferred mixtures are the mixture of nylon 11 and nylon MXD-6 and the mixture of nylon 6 and nylon MXD-6.

The vinylphenol containing polymer suitable for this invention is defined as having repeating units derived from vinylphenol or derivatives of vinylphenol, as represented by the general formula (I).

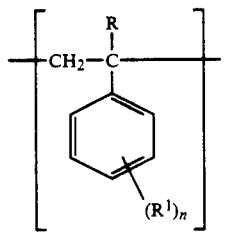

I wherein,
R is hydrogen or methyl;
n is an integer from 1 to 5; and
$R^1$ may be the same or different and represents —OH, —OSi($R^2$)$_3$, —O$R^2$, —OCO$R^2$, —OM, or tertbutyloxycarbonyloxy;
wherein
$R^2$ represents a straight or branched $C_1$ to $C_5$ alkyl group (such as, for example, methyl, ethyl, propyl, isopropyl, n-butyl, t-butyl, or pentyl), a $C_6$ to $C_{18}$ aryl group (such as, for example, benzyl, phenyl, toluyl and biphenyl), or an alkyl ether group of 2 to 5 carbon atoms (such as, for example, methoxymethyl, ethoxymethyl, and methoxyethyl); and
M represents metal cation (including, for example, univalent or divalent alkali metal cations and alkaline earth or transition metal cations including sodium, magnesium, calcium, lithium, potassium or zinc cations).

In addition to the substituent on the pendant benzene ring as represented by $R^1$, the pendant benzene ring can be substituted in up to two of the remaining positions with non-interfering substituents selected from straight or branched $C_1$ to $C_4$ alkyl groups (such as, for example, methyl, ethyl, propyl, isopropyl or butyl), halo atoms (such as, for example, fluoro, chloro, bromo or iodo), straight or branched $C_1$ to $C_4$ haloalkyl groups (such as, for example, $CF_3$, $CH_2Br$, $CF_2CF_3$), or carboxy groups.

The vinylphenol containing polymer can be a homopolymer or a copolymer. When a homopolymer, a single type of monomeric unit (as described by formula I above) is polymerized. When a copolymer, monomeric units (as described above) are copolymerized with suitable comonomers, wherein at least 15 mole percent, preferably at least 30 mole percent, of the copolymer is the vinylphenol or vinylphenol derivative defined by formula I. Suitable comonomers that may be copolymerized include α,β-ethylenically unsaturated monomers. Preferred monomers include, for example, styrene, α-methylstyrene, $C_1$ to $C_{12}$ alkyl acrylates (such as, for example, methyl methacrylate, methyl acrylate, ethyl methacrylate, ethyl acrylate, butyl methacrylate, butyl acrylate, and so on) and methacrylates, and mixtures thereof. More preferably employed as a comonomer is styrene.

More preferably, the vinyl containing polymer is defined wherein R is hydrogen, n is 1, and $R^1$ is in the para position and $R^1$ is either an —OH or if $R^1$ is defined by a substituent other than the —OH, the substituent is converted to an —OH group before it is blended with the polyamide. The conversion of the substituent to an —OH group can be accomplished by various methods known to those skilled in the art, such as, for example, by catalytic removal of dimethyl-t-butylsilyl or t-butyloxycarbonyloxy (as further illustrated in Example I), or by heat treatment at temperatures of greater than about 150° C. of t-butyloxycarbonyloxystyrene containing polymer prior to or during the melt blending process. Most preferably the vinylphenol containing polymer is a poly(vinylphenol) homopolymer.

The preferred range for the molecular weight of the vinylphenol containing polymer is between about 1,500 g/mole and about 500,000 g/mole. Particularly preferred are vinylphenol containing polymers having a molecular weight between about 30,000 g/mole and about 100,000 g/mole because the physical properties of these polymers are generally more desirable, such as, for example, strength, higher $T_g$, and heat distortion temperature (HDT). Additionally, these polymers are preferred because they have better melt processability and better film forming properties.

The vinylphenol containing polymers suitable for this invention are known and can be prepared by the various methods known to those skilled in the art. For example, the preparation of high molecular weight vinylphenol containing polymers is described in Frechet et al., "Novel Derivative of Poly(4-hydroxystyrene) with Easily Removable Tertiary, Allylic or Benzylic Ethers," *Polymer Bulletin*, Vol. 20, pp. 427–434 (1988). For the general discussion of the polymerization of vinyl monomers, see G. Odian, "Principles of Polymerization," 2nd ed. Wiley-Interscience, New York 1981.

Other additional components which may be included in the miscible blend prior to or during the blending of components (a) and (b) include plasticizers (such as tricresyl phosphate and dioctyl phthalate), stabilizers (such as IRGANOX TM, supplied by Ciba-Geigy, Hawthorne, N.Y.), dyes, flame retardants, and so on, and mixtures thereof.

The miscible blends of this invention are readily prepared by mixing about 1 to 99 parts by weight of component (a) with about 99 to 1 parts by weight of component (b), based on the 100 parts of the combined components (a) and (b). As a practical matter, most of the polymers are miscible over the entire concentration range.

Any number of methods which are known in the art may be employed in blending components (a) and (b). For example, components (a) and (b) can be mixed in their powder form and then melt blended by melt mixing and extruding the mixture, for example, in a screw extruder. In another method, the polymer components can be wet blended by dissolving both components in a solvent common for both polymers and then precipitating the blend in a non-solvent for both of the polymers. The various polymers included in this invention may have different solubility characteristics, thus the selection of the solvent must be appropriately selected, as easily determined by one skilled in the art. Examples of solvents which may be employed include, but are not limited to, dimethyl formamide (DMF), m-cresol, formic acid, pyridine, tetrahydrofuran, and so on. Additionally, mixtures of solvents may also be employed. Examples of non-solvents include, but are not limited to, hexane, ligroine, heptane, water, and so on. Alternatively, rather than precipitating the blend in a non-solvent, the blend prepared by the wet blending process can be solvent cast or coated onto an inert substrate or cast into a mold.

In accordance with this invention, the novel blends exhibit the homogeneity of a single material, as determined by a single glass transition temperature or optical transparency. If so desired, the components may be separated by conventional techniques after blending. Optionally, the blends may be cured by crosslinking the phenol units by including any curing agent as known in the art (such as, diisocyanate or diepoxides). Further, under certain conditions (such as exposure to high temperatures during melt processing) a small amount of the phenol may react with the polyamide in an interchange reaction to form a copolymer within the blend.

The novel blend is useful for both molded and film applications. The blend is particularly useful for packaging applications due to its chemical resistance and clarity. A further advantage gained by this invention is that the $T_g$ of the polyamide is increased without having to synthesize a discrete polyamide copolymer. Accordingly, this higher $T_g$ allows for uses not possible with polyamide polymers including hot filling applications (at greater than 100° C.), automotive, or outdoor applications requiring good dimensional stability at higher continuous use temperatures.

Blends prepared in accordance with the invention may be clear or opaque, depending upon the starting materials employed and the amount of crystallinity. Those having good clarity are useful for packaging of protective coatings. Those which are opaque are useful for molded parts or structural applications.

EXAMPLES

The following examples are intended to illustrate more fully the nature of the invention without acting as a limitation upon its scope. Other compositions can readily be prepared in light of this disclosure and guiding principles and teachings provided herein. As shown below, $T_g$ represents glass transition temperature, $T_c$ represents crystallization temperature, and $T_m$ represents melting point temperature. All the blends illustrated in these examples were analyzed by Differential Scanning Calorimetry (DSC) employing a Perkin-Elmer DSC7, with amorphous blends exhibiting no $T_m$ as contrasted with crystalline blends which did exhibit a measurable $T_m$. The blends were visually identified as transparent or opaque. The glass transition temperature $T_g$ of each of the inventive miscible blends was a single temperature. Immiscible blends are shown in Comparative Examples I and II where two $T_g$ values were measured for each blend.

EXAMPLE I

An amorphous vinylphenol containing polymer employed was prepared by first obtaining poly [4-(t-butyloxycarbonyloxy)styrene] ["poly(tBOC styrene)"] from the Synthetic Chemicals Division, Eastman Kodak Company. Deprotection of the poly(tBOC styrene) to form poly(vinylphenol) ("PVPh") occurred in a three-necked, round-bottomed flask equipped with mechanical stirrer, reflux condenser, and argon inlet tube by dissolving it under argon in sufficient p-dioxane to make a 15-20% solution. Trifluoroacetic acid was then added and the solution refluxed for 48 hours. The clear reaction mixture was precipitated into a large excess of water forming a white polymer. The polymer (now PVPh) was filtered and washed well with water until the pH of the washes was 6. Prior to blending the powder was sieved though a strainer and dried in a vacuum oven at approximately 75° C. for about 72 hours before use. The absolute weight average molecular weight of the PVPh used was 35,000 g/mole, as determined by size exclusion chromatography ("SEC"). The $T_g$ (midpoint) value for the PVPh was 188° C.

As identified in Table I, below, various polyamides were blended, each obtained from Scientific Polymer Products (SP²) (Ontario, New York), with the exception of MXD6, which was obtained from Mitsubishi as "MXD6-6121". Each polyamide was cooled with liquid nitrogen and ground into a powdered form prior to blending.

Prior to blending, the polyamide and PVPh powders were combined in the proportions (indicated in Table I) and shaken in a bottle for 2 min. and dried overnight in vacuum at approximately 80° C. then melt blended by using a MICROTRUDERTM laboratory extruder equipped with a ¼" screw and a 2" slit die. The temperature of the melt blending for each blending is indicated in Table I. The results for each blend are recorded in Table I below, with the physical state of the blends described as extruded.

TABLE I

Properties of Binary Blends of Polyamide/PVPh

| Polymer 1 | Polymer 2 | Proportion (polyamide/PVPh) | Melt Extrusion Temp. (°C.) | $T_g$ (°C.) (midpoint) | $T_c$ (°C.) | $T_m$ (°C.) | Physical State (as extruded) |
|---|---|---|---|---|---|---|---|
| Nylon 6 (crystalline) | PVPh (amorphous) | 3/1 | 260 | 67 | 115 | 216 | amorphous |
| Nylon 6 (crystalline) | PVPh (amorphous) | 1/1 | 260 | 97 | — | — | amorphous |
| Nylon 6 (crystalline) | PVPh (amorphous) | 1/3 | 260 | 136 | — | — | amorphous |
| Nylon 11 (crystalline) | PVPh (amorphous) | 3/1 | 260 | 60 | 97 | 182 | amorphous |
| Nylon 11 (crystalline) | PVPh (amorphous) | 1/1 | 260 | 96 | — | — | amorphous |
| Nylon 11 (crystalline) | PVPh (amorphous) | 1/3 | 260 | 143 | — | — | amorphous |
| MXD-6 (crystalline) | PVPh (amorphous) | 3/1 | 230 | 101 | 188 | 223 | amorphous |
| MXD-6 (crystalline) | PVPh (amorphous) | 1/1 | 230 | 120 | — | — | amorphous |
| MXD-6 (crystalline) | PVPh (amorphous) | 1/3 | 230 | 146 | — | — | amorphous |
| 3Me6T (amorphous) | PVPh (amorphous) | 85/15 | 260 | 158 | — | — | amorphous |
| 3Me6T (amorphous) | PVPh (amorphous) | 75/25 | 260 | 160 | — | — | amorphous |
| 3Me6T (amorphous) | PVPh (amorphous) | 50/50 | 260 | 167 | — | — | amorphous |
| 3Me6T (amorphous) | PVPh (amorphous) | 40/60 | 260 | 172 | — | — | amorphous |
| 3Me6T (amorphous) | PVPh (amorphous) | 25/75 | 260 | 176 | — | — | amorphous |
| 3Me6T (amorphous) | PVPh (amorphous) | 15/85 | 260 | 180 | — | — | amorphous |
| Nylon 6, 6 (crystalline) | PVPh (amorphous) | 1/1 | 271 | 103 | — | — | crystalline |

EXAMPLE II

Four vinylphenol/styrene copolymers, denoted A-D, were obtained as powders from a radical copolymerization and subsequent deprotection, as described previously. Copolymers A-D differed with respect to the mole percentage of vinylphenol ("VPh") present in the copolymer ("copol"), as shown in Table II below. Copolymers A and B were prepared with less than 15 mole percent of vinylphenol and therefore represent comparisons which were immiscible.

The crystalline polyamide Nylon 6 was obtained from SP² in powder form. Copolymers A-D were each individually blended with the Nylon 6 in a 1:1 ratio by melt extruding the mixed powders at 260° C., using a Microtruder laboratory extruder equipped with a ¼" screw and a 2" slit The $T_g$ data shown below in Table II for each blend is representative of the second run of a DSC scan, midpoint values. As indicated by the data, the comparisons (blends with copolymers A and B) showed two $T_g$ values, with the second reading representing the second phase of a blend that is non-miscible. Miscible blends (those made with copolymers C and D) were transparent upon extrusion and displayed one $T_g$ only.

TABLE II

Properties of Poly(vinylphenol-co-styrene)/Nylon 6 Blends

| Run | Mol % VPh in copol | Nylon 6/ copol ratio | $T_g$ (°C.) | $T_m$ (°C.) Nylon 6 | Miscible Blend |
|---|---|---|---|---|---|
| A | 5 | 1/1 | 59, 110 | 221 | no |
| B | 14 | 1/1 | 56, 114 | 220 | no |
| C | 34 | 1/1 | 83 | 213 | yes |
| D | 52 | 1/1 | 85 | 199 | yes |

EXAMPLE III

The miscibility of a ternary polyamide/polyamide/PVPh blend was discovered when the procedure of Example I was repeated employing combinations of the polymers, as indicated in Table III. As shown, the miscible ternary blends exhibited a single $T_g$.

TABLE III

Properties of Ternary Polyamide/Polyamide/PVPh Blends

| Polymer 1 | Polymer 2 | Polymer 3 | Proportion | $T_g$ °C. |
|---|---|---|---|---|
| Nylon 6 | MXD-6 | PVPh | 1/1/1 | 100 |
| Nylon 6 | MXD-6 | PVPh | 1/1/3 | 127 |
| Nylon 11 | MXD-6 | PVPh | 1/1/10 | 163 |

COMPARATIVE EXAMPLE I

A fully aromatic polyamide (midpoint $T_g$ of 251° C.) of the structure:

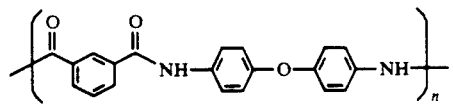

was blended with the PVPh described in Example I. Each polymer powder was measured out to a 0.2 g quantity and dissolved separately in 4.0 ml each of N,N-dimethylformamide. The polymer solutions were then combined in a 1:1 ratio and the polymer blend was precipitated into a 200:1 excess of water. The precipitate was dried overnight in a vacuum at 83° C. The precipitated blend was analyzed by DSC and showed two $T_g$ values of 189° C. and 252° C.

COMPARATIVE EXAMPLE II

A polyamide-imide (midpoint $T_g$ of 269° C) of the structure:

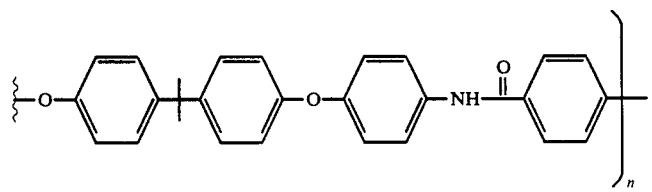

was blended with the PVPh described in Example I. Each polymer powder was measured out to a 0.2 g quantity and dissolved separately in 4.0 ml each of N,N-dimethylformamide. The polymer solutions were then combined in a 1:1 ratio and the polymer blend was precipitated into a 200:1 excess of water. The precipitate was dried overnight in a vacuum at 83° C. The precipitated blend was analyzed by DSC and showed two $T_g$ values of 197° C. and 258° C.

The invention has been described in detail with particular reference to preferred embodiments thereof, but it will be understood that variations and modifications can be effected within the spirit and scope of the invention. All patents, patent applications (published or unpublished, domestic or foreign), scientific literature, books and other prior art cited herein are each incorporated herein by reference for the teaching therein pertinent to this invention.

We claim:

1. A miscible blend composition comprising (a) a polyamide selected from the group consisting of nylon 4; nylon 4.6; nylon 6; nylon 6.6; nylon 6.9; nylon 6.10; nylon 6.12; nylon 11; nylon 12; nylon 3Me6T; and nylon MXD-6 and (b) a vinylphenol containing polymer, wherein said miscible blend has a single glass transition temperature.

2. A miscible blend according to claim 1 wherein said polyamide is nylon 6; nylon 6,6; nylon 11; nylon 3Me6T; or nylon MXD-6.

3. A miscible blend according to claim 1 wherein said polyamide is mixture selected from the group consisting of the mixture of nylon 11 and nylon MXD-6 and the mixture of nylon 6 and nylon MXD-6.

4. A miscible blend according to claim 1 wherein vinylphenol containing polymer is derived from repeating units represented by formula:

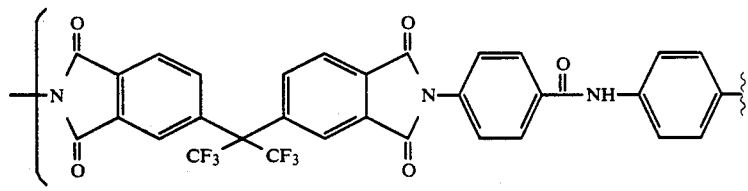

wherein
R is hydrogen or methyl;
n is an integer from 1 to 5; and
$R^1$ may be the same or different and represents —OH, —OSi($R^2$)$_3$, —OR$^2$, —OCOR$^2$, —OM, or tert-butyloxycarbonyloxy;
wherein
$R^2$ represents a straight or branched $C_1$ to $C_5$ alkyl group, a $C_6$ to $C_{18}$ aryl group, or an alkyl ether group of 2 to 5 carbon atoms; and
M represents metal cation.

5. A miscible blend according to claim 4 wherein said vinylphenol containing polymer contains up to about 70 mole percent of a $\alpha,\beta$-ethylenically unsaturated comonomer selected from styrene, $C_1$ to $C_{12}$ alkyl acrylate, methacrylate, or mixtures thereof.

6. A miscible blend according to claim 4 wherein said vinylphenol containing polymer contains up to about 70 mole percent of styrene.

7. A miscible blend according to claim 6 wherein in formula I, R is hydrogen, n is 1, and $R^1$ is an —OH in a para position.

8. A miscible blend according to claim 3 wherein said vinylphenol containing polymer is a poly(vinylphenol) homopolymer.

9. A miscible blend according to claim 3 wherein said vinylphenol containing polymer has a molecular weight within the range of from about 30,000 g/mole to about 100,000 g/mole.

10. A miscible blend according to claim 1 wherein said polyamide is present in an amount from about 1 to 99 parts by weight and said vinylphenol containing polymer is present in an amount from about 99 to 1 parts by weight, with parts by weight based on the combined weight of said polyamide and said vinylphenol containing polymers.

11. A miscible blend according to claim 1 further comprising an additive selected from the group consisting of plasticizers, stabilizers, dyes, flame retardants, and mixtures thereof.

12. A blend according to claim 1 wherein said blend is cured.

13. A process for preparing the miscible blend according to claim 1 comprising melt blending said polymers.

14. A process according to claim 12 further comprising curing the miscible blend with a curing agent selected from the group consisting of diisocyanate and diepoxides.

15. A process for preparing the miscible blend according to claim 1 comprising wet blending said polymers by employing a solvent common to said polyamide, and said vinylphenol containing polymer.

16. A process according to claim 15 further comprising precipitating said blend with a non-solvent after said wet blending.

17. A process according to claim 15 further comprising solvent casting or coating said blend onto an inert substrate after said wet blending.

18. A process according to claim 15 further comprising curing the miscible blend with a curing agent selected form the group consisting of diisocyante and diepoxides.

19. An article of manufacture comprising the blend recited in claim 1 wherein the article is a film.

* * * * *